No. 771,268.

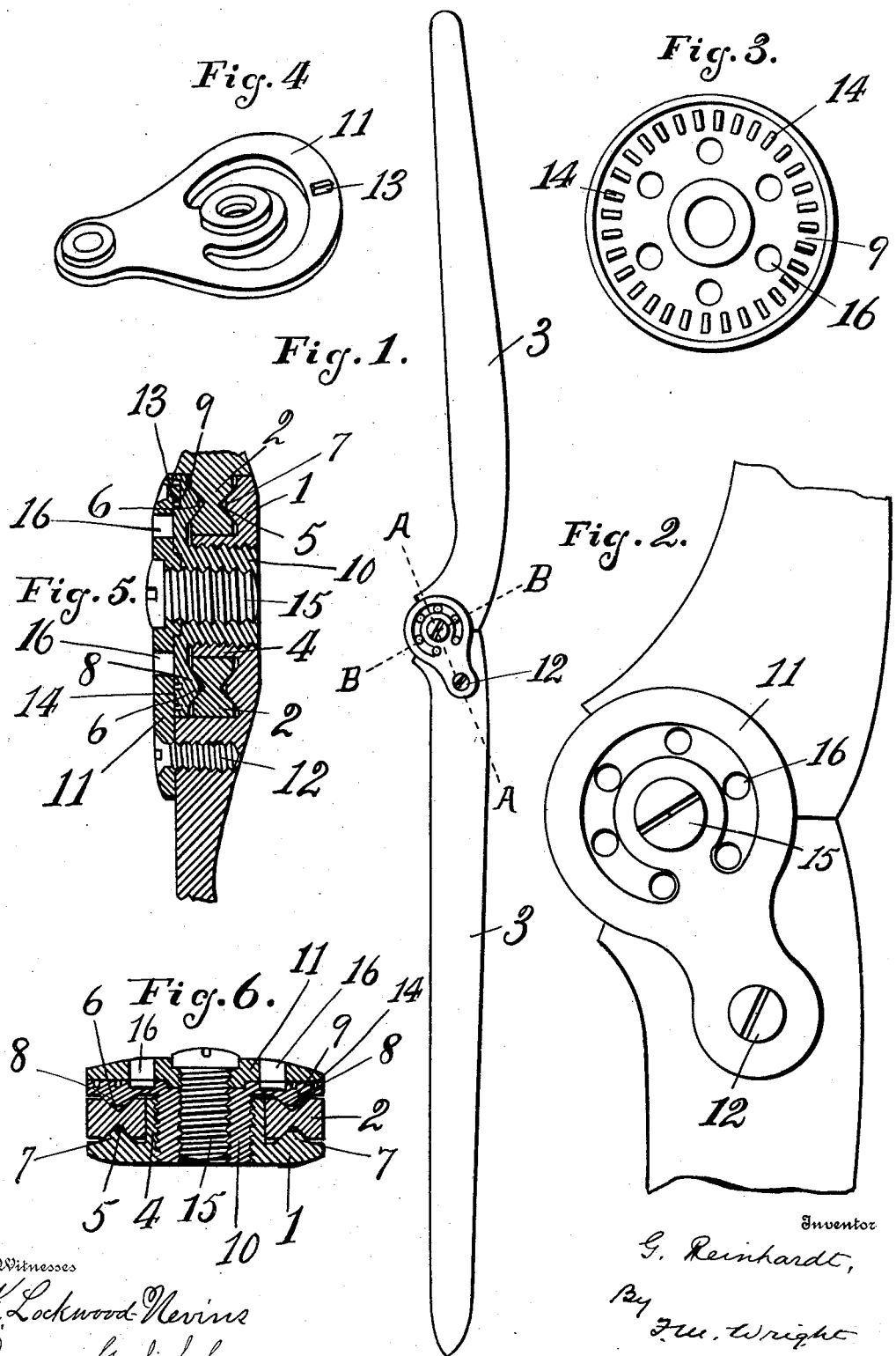

Patented October 4, 1904.

UNITED STATES PATENT OFFICE.

GOTTLOB REINHARDT, OF ELMHURST, CALIFORNIA.

JOINT FOR ARTIFICIAL LIMBS, &c.

SPECIFICATION forming part of Letters Patent No. 771,268, dated October 4, 1904.

Application filed May 11, 1904. Serial No. 207,489. (No model.)

*To all whom it may concern:*

Be it known that I, GOTTLOB REINHARDT, a citizen of the United States, residing at Elmhurst, in the county of Alameda and State of California, have invented certain new and useful Improvements in Joints for Artificial Limbs and the Like, of which the following is a specification.

My invention relates to an improved joint for artificial limbs or the like, the object of my invention being to provide a joint which, while being sufficiently thin for the purpose specified, shall have great strength against lateral flexure or strain and in which the wear can be taken up conveniently and expeditiously.

My invention therefore resides in the novel construction, combination, and arrangement of parts for the above ends, hereinafter fully specified, and particularly pointed out in the claims.

In the accompanying drawings, Figure 1 is a front view showing two bars united by my improved joint. Fig. 2 is an enlarged front view of the joint proper. Fig. 3 is a plan view of the clamping-screw. Fig. 4 is a perspective view of the adjusting spring-plate. Fig. 5 is a section on the line A A of Fig. 1. Fig. 6 is a similar view on the line B B of said figure.

Referring to the drawings, 1 represents the rear member, and 2 the front member, of the joint, said members being formed integral with bars 3. The rear member has a hub 4, which enters a socket formed in the front member. Said front member has on its opposite sides beveled grooves 5 and 6. Into the rear groove 5 enters a beveled rib 7, formed on the rear member around the hub 4. Into the front groove 6 enters a beveled rib 8, formed on the under side of the head or plate 9 of the hollow clamping-screw 10. The body of said screw is screwed down into the threaded inner surface of the hub 4, and it is by screwing said clamping-screw down into said hub that the two members are tightened to a greater or less degree. It will be observed that the base of each rib extends away from the rim of the corresponding groove, so that the surface of the member around the base of the rib is spaced from the surface of the member around the upper edge of the groove. This permits of wear being taken up by screwing up the screw 10. If the shoulders or parts of the members adjacent to the base of the rib and the rim of the groove abutted against each other, this wear could not be taken up.

The clamping-screw 10 is held in its position, permitting the joint to have the desired degree of looseness, by means of a spring-plate 11, secured to the front side of the rear member 1 by means of a screw 12 and having on its under side a pin or projection 13, which engages one of the recesses between a circular series of teeth 14 on the face of the screw-head 9. Said spring-plate is held down by means of a locking-screw 15, which is passed through a central hole in said spring-plate and is screwed down into the threaded central aperture of the hollow clamping-screw 10. When said locking-screw 15 is screwed down tight, the pin 13 on the under side of the spring-plate 11 engages the teeth 14 with sufficient strength to prevent the clamping-screw being turned; but when it is desired to tighten or loosen the joint between the two members said locking-screw 15 is given about a half-turn outward, which releases said spring-plate 11 to a sufficient extent to allow it to spring outward when the clamping-screw 10 is turned in either direction, so that the pin 13 engages a different portion of the circular rack 14. For the purpose of turning said clamping-screw 10 the spring-plate 11 is cut out in the greater part of a circle, as shown, over a circular series of sockets 16, adapted to receive the prongs of a forked wrench, so that after having unscrewed the screw 15 by applying such a wrench to two diametrically opposite sockets 16 of the clamping-screw said screw can be turned slightly in one direction or the other to tighten or loosen the same. Then the screw 15 is screwed up again tight, so that the pin on the under side of the spring-plate bears firmly down upon the rack and positively prevents its being turned, thus insuring that the degree of looseness between the two members of the joint is maintained until increased by wear between the bearing-surfaces thereof, when it will be necessary to tighten up the joint.

It will be observed that on account of the comparatively large number of teeth in the circular rack the degree of tightness can be adjusted with the utmost accuracy.

I claim—

1. A joint for artificial limbs and the like comprising two members, one of which has an internally-threaded hollow hub entering a socket in the other member, and a clamping-screw screwed into said hub, one of said members having a beveled circular rib, and the other a beveled circular groove receiving said rib, the base of the rib extending away from the rims of the groove whereby the surface of the member around the base of the rib is spaced from that around the upper edge of the groove permitting the rib to enter farther into the groove when reduced by wear and allowing the tightening of the screw to compensate for wear, substantially as described.

2. A joint for artificial limbs and the like comprising two members, one of which has an internally-threaded hollow hub, entering a socket in the other member, and a clamping-screw screwed into said hub, one of said members being intermediate between the screw and the other member, the screw and the outer member having beveled circular ribs, and the intermediate member having on each side beveled circular grooves receiving said ribs, substantially as described.

3. A joint comprising two members and a clamping-screw, one of said members having an internally-threaded hollow hub into which the screw is screwed, said members and the under face of the clamping-screw having co-registering beveled circular grooves and ribs engaging each other, whereby wear can be taken up by turning the screw, substantially as described.

4. A joint comprising two members and a clamping-screw, one of said members having an internally-threaded hollow hub into which the screw is screwed, said members and the under face of the clamping-screw having co-registering beveled circular grooves and ribs engaging each other, whereby wear can be taken up by turning the screw, and a locking-plate provided with means for engaging the head of the clamping-screw to lock it in position, substantially as described.

5. A joint comprising two members and a clamping-screw, one of said members having an internally-threaded hollow hub into which the screw is screwed, said members and the under face of the clamping-screw having co-registering beveled circular grooves and ribs engaging each other, whereby wear can be taken up by turning the screw, a locking-plate, the head of the clamping-screw having a circular rack and the locking-plate having a tooth engaging said rack, and means for holding down the tooth upon the rack, substantially as described.

6. A joint comprising two members and a clamping-screw, one of said members having an internally-threaded hollow hub into which the screw is screwed, said members and the under face of the clamping-screw having co-registering beveled circular grooves and ribs engaging each other, whereby wear can be taken up by turning the screw, and a locking-plate provided with means for engaging the head of the clamping-screw to lock it in position, the locking-plate being cut away in the greater part of a circle leaving a central socketed portion, a screw passed through said socketed portion and engaging the threaded inner surface of the clamping-screw, and the clamping-screw having a circular series of sockets beneath the cut-out portion of the clamping-screw, substantially as described.

7. A joint comprising two members and a clamping-screw, a locking-plate, the head of the clamping-screw having a circular rack and the locking-plate having a tooth engaging said rack, and means for holding down the tooth upon the rack, substantially as described.

8. A joint comprising two members and a clamping-screw, a locking-plate provided with means for engaging the head of the clamping-screw to lock it in position, the locking-plate being cut away in the greater part of a circle leaving a central socketed portion, a screw passed through said socketed portion and engaging the threaded inner surface of the clamping-screw, and the clamping-screw having a circular series of sockets beneath the cut-out portion of the clamping-screw, substantially as described.

In witness whereof I have hereunto set my hand in the presence of two subscribing witnesses.

G. REINHARDT.

Witnesses:
  Francis M. Wright,
  Bessie Gorfinkel.